Figure 1:
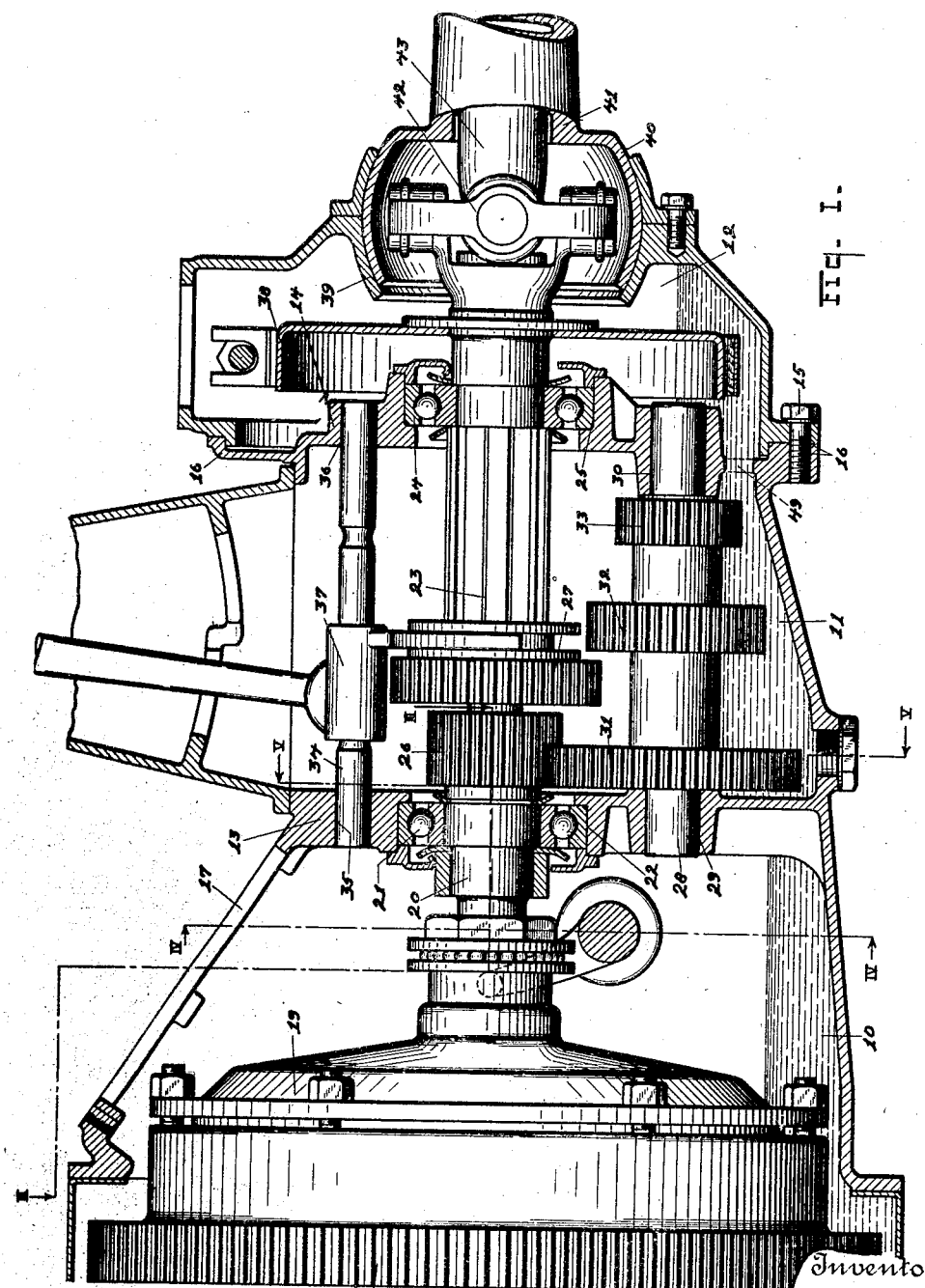

June 26, 1923.

E. H. BELDEN

LUBRICATING SYSTEM

Filed Dec. 7, 1917

1,459,815

4 Sheets-Sheet 1

Inventor
Edward H. Belden
By Chester H. Braselton
Attorney

June 26, 1923.
E. H. BELDEN
LUBRICATING SYSTEM
Filed Dec. 7, 1917
1,459,815
4 Sheets-Sheet 2
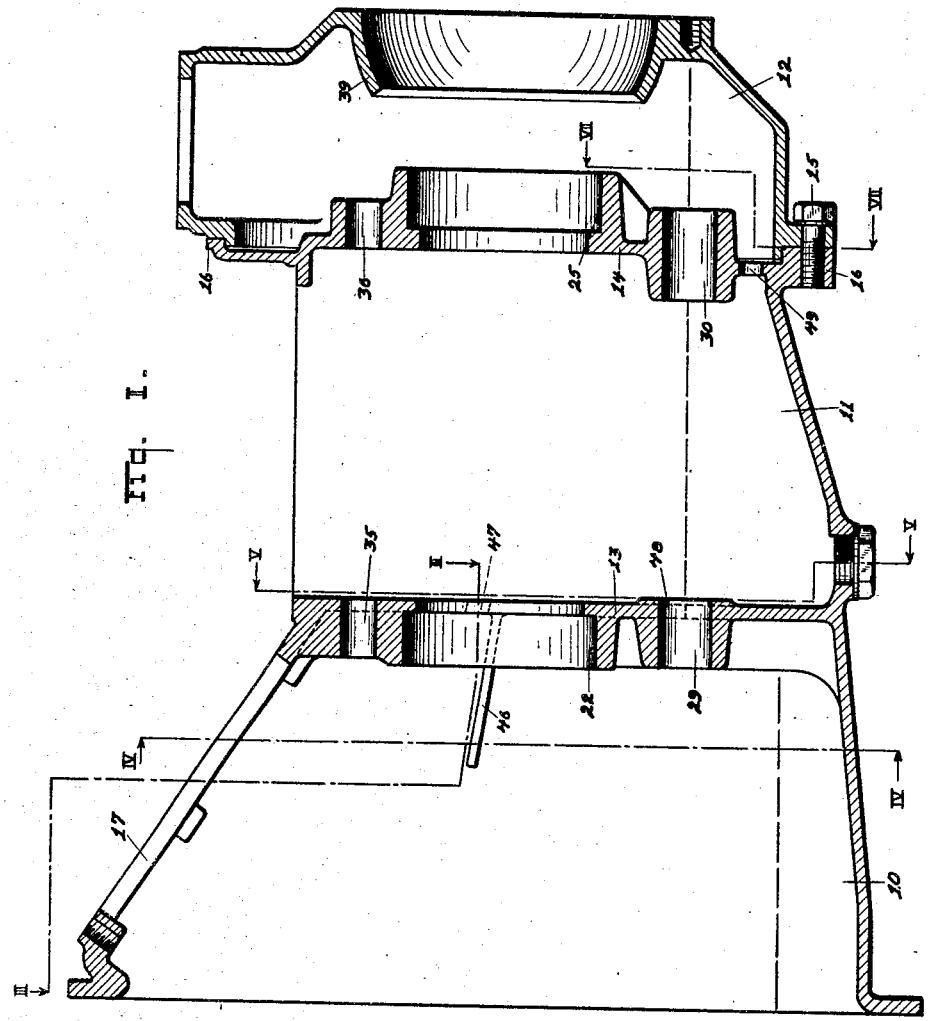
Inventor
Edward H. Belden
By Chester H. Braselton
Attorney June 26, 1923.
E. H. BELDEN
LUBRICATING SYSTEM
Filed Dec. 7, 1917
1,459,815
4 Sheets-Sheet 3
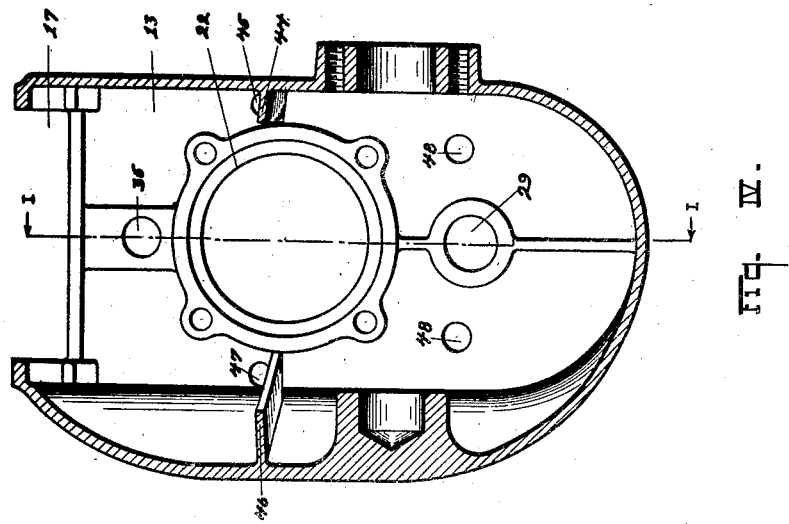
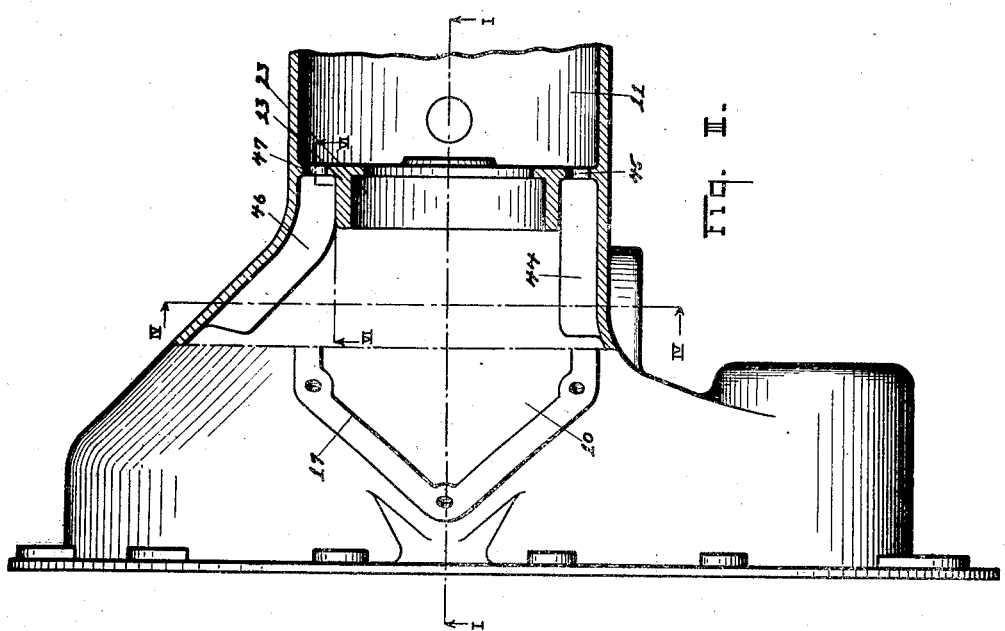
Inventor
Edward H. Belden
By Chester H. Braselton
Attorney June 26, 1923.
E. H. BELDEN
LUBRICATING SYSTEM
Filed Dec. 7, 1917
1,459,815
4 Sheets-Sheet 4
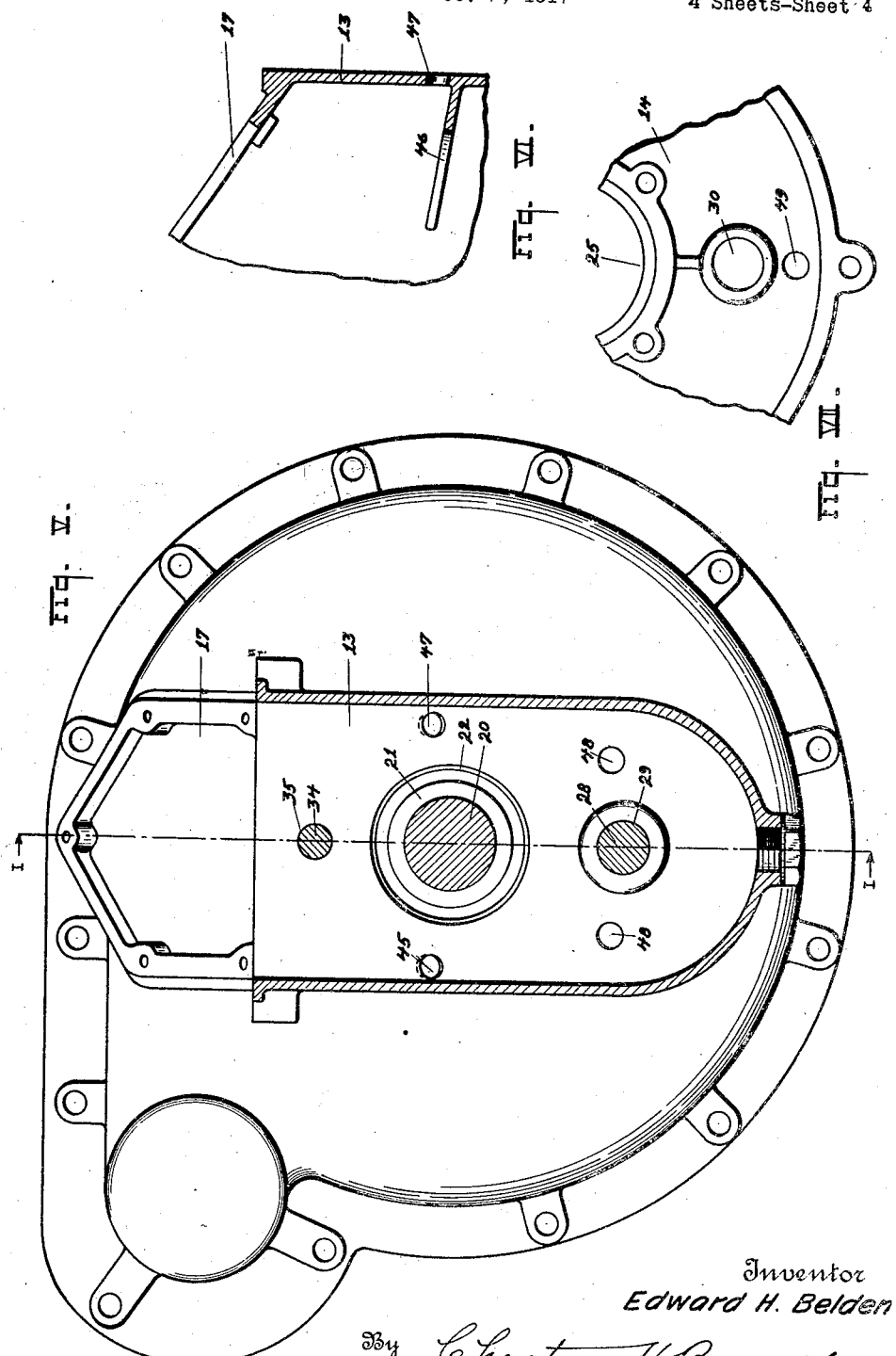
Inventor
Edward H. Belden
By Chester H Braselton
Attorney Patented June 26, 1923.

1,459,815

UNITED STATES PATENT OFFICE.

EDWARD H. BELDEN, OF TOLEDO, OHIO, ASSIGNOR, BY MESNE ASSIGNMENTS, TO THE WILLYS-OVERLAND COMPANY, OF TOLEDO, OHIO, A CORPORATION OF OHIO.

LUBRICATING SYSTEM.

Application filed December 7, 1917. Serial No. 205,966.

*To all whom it may concern:*

Be it known that I, EDWARD H. BELDEN, a citizen of the United States, residing at Toledo, in the county of Lucas and State of Ohio, have invented certain new and useful Improvements in Lubricating Systems, of which I declare the following to be a full, clear, and exact description.

This invention relates to lubrication systems for motor vehicles and more particularly to systems for lubricating the transmission mechanism of a motor vehicle.

The principal object of this invention is to provide a lubricating system having improved means for feeding lubricating oil from the clutch mechanism to the transmission mechanism and maintaining a higher oil level in the chamber containing the transmission mechanism than in the chamber containing the clutch and fly wheel.

A further object of my invention is to provide, in a gear casing having chambers for a clutch mechanism, a transmission mechanism and a transmission brake, improved means for feeding lubricant from the clutch chamber to the transmission chamber and from the transmission chamber to the transmission brake chamber.

A further object of my invention is to provide very simple and easily constructed means for directing lubricant from the chamber containing the clutch and fly wheel to the transmission mechanism.

Further objects, and objects relating to economies of manufacture and details of construction, will definitely appear from the detailed description to follow:

I accomplish the objects of my invention by the devices and means described in the following specification. My invention is clearly defined and pointed out in the appended claims.

A structure constituting a preferred embodiment of my invention is illustrated in the accompanying drawings, forming a part of this specification, in which:

Figure I is a longitudinal, sectional view, through a gear casing, embodying my invention, taken substantially on the line I—I of Figures III, IV and V.

Figure II is a view of the gear casing on a line similar to that of Figure I, but with all the parts removed from the gear casing.

Figure III is a detail, sectional view, taken substantially on the line III—III of Figures I and II.

Figure IV is a detail, sectional view, taken substantially on the line IV—IV of Figures I, II and III.

Figure V is a detail, sectional view, taken substantially on the line V—V of Figures I and II.

Figure VI is a fragmentary, detail, sectional view, taken substantially on the line VI—VI of Figure III, and, Figure VII is a fragmentary, detail, sectional view, taken substantially on the line VII—VII of Figure II.

In the drawings, similar reference numerals refer to similar parts throughout the several views, and the sectional views are taken looking in the direction of the little arrows at the ends of the section lines.

Considering the numbered parts of the drawing, I have shown a gear casing which is divided into chambers or compartments 10, 11 and 12, by means of the transversely extending partitions 13 and 14. The compartment 12 is formed by a casing member which is secured to the flange 16, adjacent the partition 14, by means of the bolts 15. An opening 17 is provided in the top of the gear casing affording admittance to the forward chamber 10. The fly wheel 18 and the clutch 19 are disposed in the forward chamber 10 and connected with a driven shaft 20 which is journaled in the bearing 21 mounted in the opening 22 in the partition wall 13. The main transmission shaft 23 is journaled in the bearing 21 and the bearing 24 mounted in the opening 25 of the partition wall 14 and said main transmission shaft carries the gears 26 and 27. A counter shaft 28 is journaled in the openings 29 and 30 in the partition walls 13 and 14, respectively, and carries the gears 31, 32 and 33, all located within the chamber 11. A rod 34 has its ends mounted in the openings 35 and 36 in the partition walls 13 and 14, respectively, the rod 34, the counter shaft 28 and the main shaft 23 having their axes in vertical alignment with the rod 34 above the main shaft and the countershaft 28, below the main shaft. The gear-actuating sleeve 37 is slidably mounted on the rod 34. The transmission brake 38 is mounted on the main transmission shaft 23 within the chamber 12. The rear wall of the chamber 12 has the socket portion 39 which is engaged by the ball portion 40 at the forward end of the casing 41, which surrounds the propeller shaft 43, the latter being connected to the main transmission shaft 23 through the universal joint 42.

Ports 45 and 47 are formed in the partition wall 13 in horizontal alignment with the axis of the shaft 20 and one on either side of the opening 22. A flange 44 is formed on the side wall of the chamber 10 and extends rearwardly and upwardly from the partition wall 13, as shown in the drawings. A similar flange 46 extends from the opposite side wall of the chamber 10 rearwardly and upwardly from the partition wall 13, said flange 46 being curved somewhat and following the outline of the side wall of the chamber 10. The forward ends of these flanges 44 and 46 meet the partititon wall 13 just below the lower edges of the ports 45 and 47 and each of the flanges 44 and 46 slope downwardly from its free edge to the side wall of the chamber 10 so that these flanges form, with the side walls, troughs which slope downwardly to the partition 13 and the ports 45 and 47. Return ports 48 are formed in the partition 13 in horizontal alignment with the axis of the counter-shaft 28 and one on either side of the opening 29. These return ports 48 connect the chambers 11 and 10. A port 49 is formed in the partition wall 14 in line with and below the opening 30 in said partition wall, in which the countershaft 28 is mounted. This port 49 connects the chambers 11 and 12.

From the description of the parts given above, the operation should be very readily understood. The chamber 10 contains a quantity of lubricating oil, the oil level in said chamber being approximately as indicated in Figure I of the drawings. As the flywheel 18 and clutch 19 revolve, in view of the fact that their lower portion is immersed in the oil contained in the chamber 10, oil is splashed up on the upper side walls of the chamber so that the chamber 10 is practically filled with a mist of finely divided lubricating oil. As this oil collects on the side walls of the chamber and runs down toward the bottom of the chamber, a portion is intercepted by the intercepting flanges or fins 44 and 46 and, because of the slope of these flanges, is directed through the ports 45 and 47 into the chamber 11 which contains the transmission mechanism. The ports 48 connect the chamber 11 with the chamber 10 so that the lubricating oil in the chamber 11 can flow back into the chamber 10, but the oil will always be maintained in the chamber 11 at a level in line with the lower edges of the ports 48 and as these are somewhat higher than the normal level of the oil in the chamber 10, lubricant will be maintained at a higher level in the transmission chamber than in the clutch chamber. The port 49 connects the chamber 11 to the chamber 12, containing the transmission brake and hence, lubricant will be maintained in both chambers 11 and 12 at substantially the same level as if they were the same chamber. This serves to cool the transmission brake, since the lower part of the transmission brake is immersed in the lubricant in the chamber 12. A certain amount of this lubricant can also work its way up into the socket 39 so as to lubricate the ball and socket connection there, as well as the universal joint 42, but sufficient oil cannot work its way up into the ball and socket so that lubricant can run down the casing 43 to the rear axle, which is an event to be avoided.

I am aware that the particular embodiment of my invention, which I have here described, is susceptible of considerable variation without departing from the spirit thereof, and, therefore, I desire to claim my invention broadly, as well as specifically, as indicated by the appended claims.

Having thus described my invention, what I claim as new and desire to secure by Letters Patent, is:

1. A lubricating system for motor vehicles comprising the combination of a gear casing, provided with a partition dividing it into separate chambers, a port in said partition above the oil level in the chambers, means in one of the chambers for directing lubricating oil against the side walls of the chamber, and a horizontally inclined flange integrally secured to the side wall of that chamber and extending to the partition to direct oil through said port into the second chamber.

2. In a lubricating system, the combination of a gear casing provided with a partition dividing it into separate chambers, a port in said partition above the oil level in the chambers, a rotating member inclosed in one chamber and adapted to carry oil, and a substantially flat horizontally inclined flanged integrally secured to the side wall of that chamber and extending to the partition to direct oil through said port into the second chamber.

3. In a lubricating system, a gear casing provided with a partition dividing it into separate chambers, ports in said partition above the oil level in the chambers, a rotating member inclosed in one chamber, adapted to carry oil, and horizontally inclined flanges secured to the side walls of that chamber and extending to the partition where their lower ends are in substantial registry with the ports whereby oil is directed into the second chamber.

4. In a lubricating system, the combination of a gear casing provided with a partition dividing it into separate chambers, a port in said partition above the oil level in the chambers, a rotating member inclosed in one chamber, the plane of rotation of which is substantially parallel to the partition, and a horizontally inclined flange secured to the side wall of that chamber and extending to the partition to direct oil through said port into the second chamber, and a return port connecting said chambers.

5. In a lubricating system, a gear casing provided with a partition dividing it into separate chambers, ports in said partition above the oil level in the chambers, a rotating member inclosed in one chamber, and horizontally inclined flanges integral with the side walls of that chamber and extending to the partition where their lower ends are in substantial registry with the ports whereby oil is directed into the second chamber, and a return port connecting said chambers.

6. In a lubricating system, the combination of a gear casing provided with a partition, dividing it into separate chambers, a port in said partition above the oil level in the chambers, a rotating member inclosed in one chamber and adapted to deposit oil on the wall of such chamber, a horizontally inclined flange offset from the plane of rotation of the rotating member and secured to the side wall of that chamber and extending to the partition to direct oil through said port into the second chamber, and a return port connecting said chambers so positioned as to maintain the oil in the second chamber at a higher level than the oil in the first named chamber.

7. In a lubricating system, a gear casing provided with a partition dividing it into separate chambers, ports in said partition above the oil level in the chambers, a rotating member inclosed in one of the chambers, and adapted to carry oil, horizontally inclined flanges offset from the plane of rotation of said member, secured to the side walls of that chamber and extending to the partition where their lower ends are in substantial registry with the ports whereby oil is directed into the second chamber, and a return port connecting said chambers so positioned as to maintain the oil in the second chamber at a higher level than the oil in the first named chamber.

8. A lubricating system for motor vehicles, comprising the combination of a gear casing; a partition dividing said casing into a clutch chamber and a transmission chamber; a port in said partition above the oil level in said clutch chamber; a transversely and longitudinally inclined, substantially flat flange extending from the side wall of said gear casing and adapted to direct oil through said port into said transmission chamber; and a return port connecting said transmission chamber and said clutch chamber.

9. A lubricating system for motor vehicles, comprising the combination of a gear casing; a partition dividing said casing into a clutch chamber and a transmission chamber; a port in said partition above the oil level in said clutch chamber; a flange extending from the side wall of said gear casing within said clutch chamber and sloping upwardly from said partition and adapted to direct oil through said port into said transmission chamber; and a return port connecting said transmission chamber and said clutch chamber.

10. A lubricating system for motor vehicles, comprising the combination of a gear casing; a partition dividing said casing into a clutch chamber and a transmission chamber; a port in said partition above the oil level in said clutch chamber; a flange extending from the side wall of said gear casing within said clutch chamber and sloping from said partition, at a point substantially in line with said port, upwardly, said flange sloping from its free edge downwardly to the wall of the gear casing; and a return port connecting said transmission chamber and said clutch chamber.

11. A lubricating system for motor vehicles, comprising the combination of a gear casing; a partition dividing said casing into a clutch chamber and a transmission chamber; a pair of ports in said partition above the oil level in said clutch chamber and adjacent the side walls of said gear casing; a pair of flanges extending from the side walls of said gear casing within said clutch chamber, each of said flanges sloping upwardly from the partition at a point substantially in line with said ports, each of said flanges sloping downwardly from its free edge to the side wall of the casing; and a return port in said partition connecting said transmission chamber and said clutch chamber.

12. A lubricating system for motor vehicles, comprising the combination of a gear casing; partitions dividing said casing into three chambers; a clutch, a transmission and a transmission brake, located in said chambers respectively; means for directing a flow of oil from said clutch chamber into said transmission chamber; means for maintaining an oil level in said transmission chamber above that in the clutch chamber; and a port below the oil level in said transmission chamber communicating with said transmission brake chamber.

13. A lubricating system for motor vehicles, comprising the combination of a casing; partitions dividing said casing into a clutch chamber; a transmission chamber and a transmission brake chamber; a port connecting said clutch chamber and said transmission chamber above the oil level in said clutch chamber; an intercepting flange projecting from the side wall of said clutch chamber and sloping downwardly towards said partition and adapted to direct a flow of oil through said port into said transmission chamber; a return port connecting said transmission chamber and said clutch chamber; and a port, below the oil level in said transmission chamber, connecting said chamber with said transmission brake chamber.

14. In combination, a shaft, a fly wheel and clutch mounted thereon, a casing surrounding said fly wheel and clutch and in close proximity thereto, a bearing for said shaft, said casing having a partition therein supporting said bearing and having an integral flange formed in a side wall thereof opposite said shaft and axially displaced from said fly wheel and clutch, said partition having an opening therethrough at the end of said flange whereby lubricant collected by said flange is conveyed through said partition.

In testimony whereof, I affix my signature.

EDWARD H. BELDEN.